May 5, 1936.     O. URSINUS     2,040,066
COMPARISON MICROSCOPE
Filed April 5, 1935     3 Sheets-Sheet 1
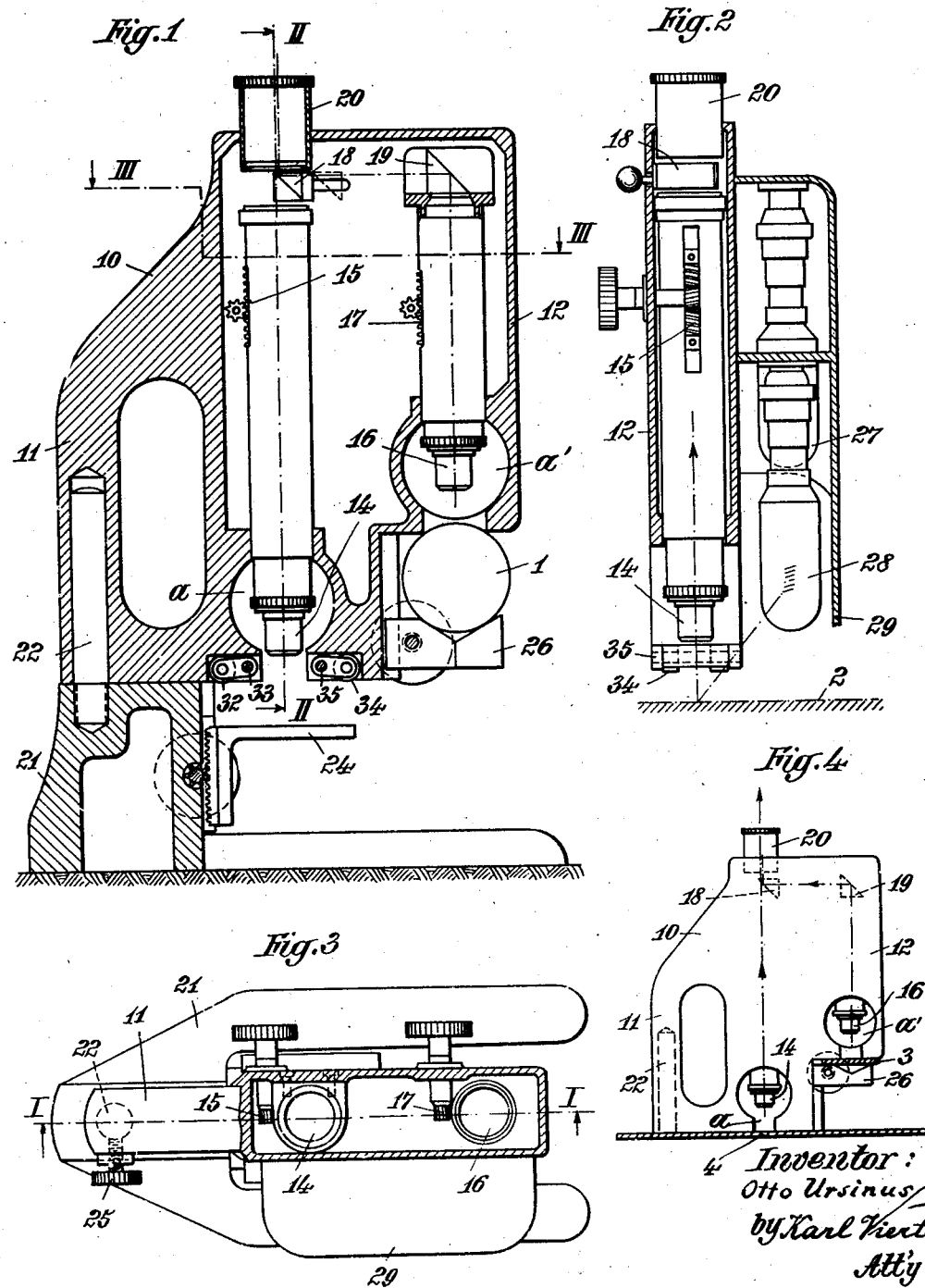
Inventor:
Otto Ursinus
by Karl Viertel
Att'y

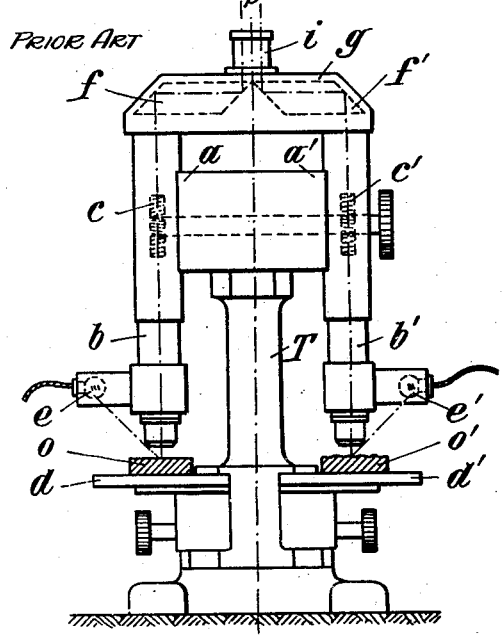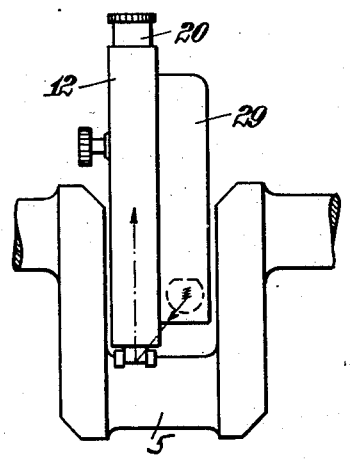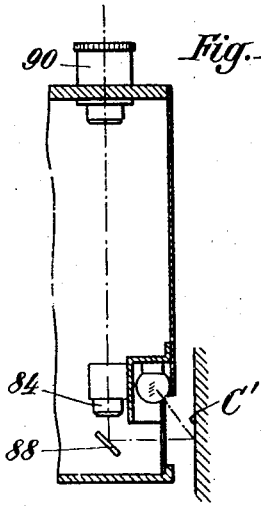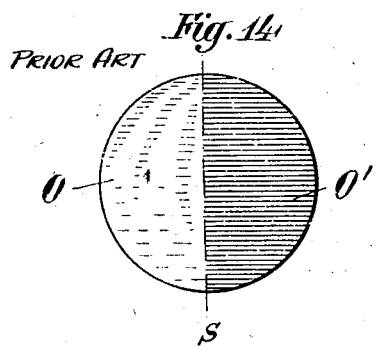

May 5, 1936. O. URSINUS 2,040,066
COMPARISON MICROSCOPE
Filed April 5, 1935 3 Sheets-Sheet 3
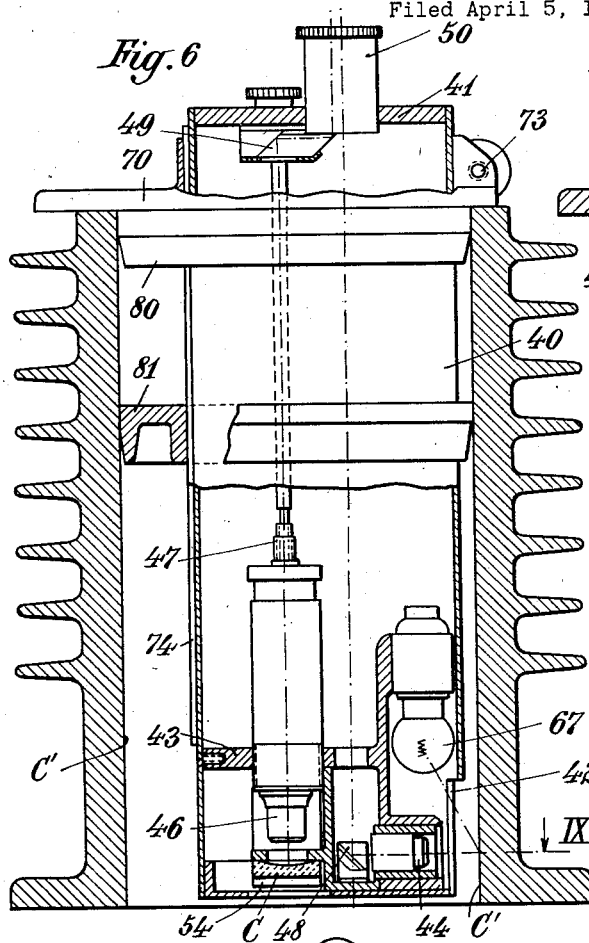
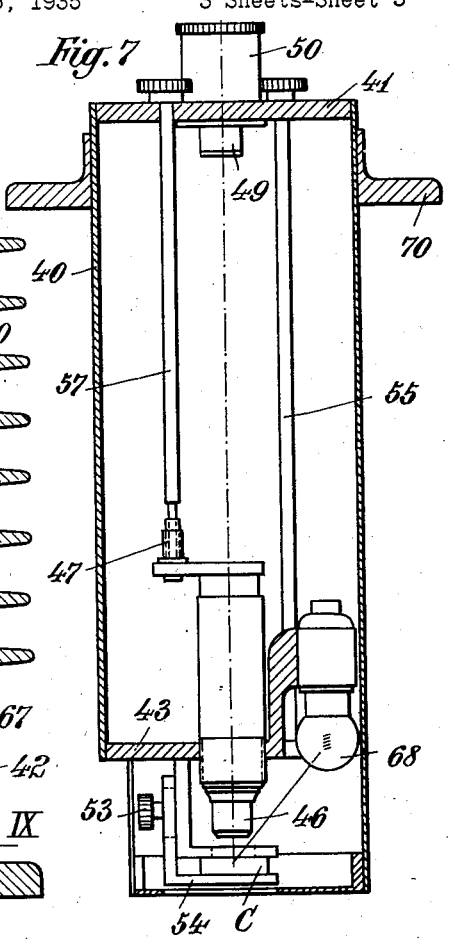
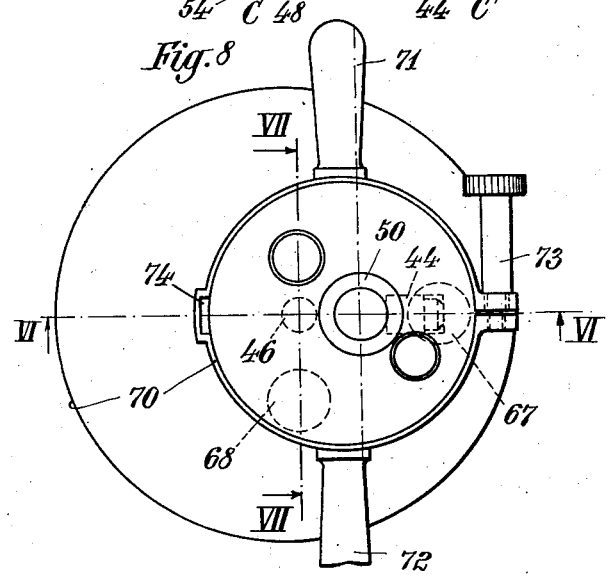
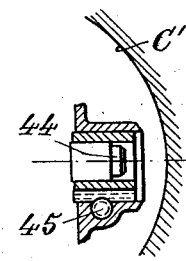
Inventor:
Otto Ursinus
by Karl Viertel
Att'y Patented May 5, 1936

2,040,066

UNITED STATES PATENT OFFICE 2,040,066

COMPARISON MICROSCOPE

Otto Ursinus, Rathenow, Germany, assignor to firm Emil Busch, Aktiengesellschaft, Optische Industrie, Rathenow, Germany Application April 5, 1935, Serial No. 14,882
In Germany July 9, 1934

7 Claims. (Cl. 88—39)

My invention relates to improvements in microscopes of the twin type, known in the optical trade in Germany as "Comparison-Microscopes", and being designed for testing surfaces viz. so as to enable the operator to ascertain external features of an object to be tested—for instance the higher or lower degree of smoothness of its surface, the absence of scratches etc.—by comparing the surface concerned with the typical or normal surface of a standard article.

In order to render more easily comprehensible the various objects of this invention and to more fully acquaint the reader with the salient features by which said objects are attained, a brief synopsis of the structural and functional properties of microscopes of the twin type set forth is first presented with reference to Figs. 11-14 of the accompanying drawings, of which Fig. 11 is a front elevation showing diagrammatically a twin microscope of known design, Fig. 12 is a plan of the object under examination on the microscope, Fig. 13 is a plan of the standard object on the microscope, Fig. 14 is a diagrammatic reproduction of the twin image visible in the eye piece of the microscope.

The microscope shown in Fig. 11 essentially consists of: a stand T formed with two arms $a$, $a'$ projecting therefrom, two objectives $b$, $b'$ of substantially equal focal length, which are mounted on said arms, their axes being parallel to each other; rack and pinion gears $c$, $c'$ for simultaneously focussing both objectives; two stages $d$, $d'$, individually adjustable, on which the standard object $o$ and the object $o'$ to be tested are placed; electric lamps $e$, $e'$ enclosed in shades for illuminating the surfaces of the objects concerned; light reflecting means $f$, $f'$ enclosed in a casing $g$; and one single eye piece $i$ mounted in the middle of said casing with its optical axis substantially in line with the vertical main plane of symmetry S—S of the whole instrument; the said reflecting means are so arranged and cooperatively associated with both objectives $b$, $b'$ and the eye piece $i$, that magnified images O, O' of the upper faces of the plates $o$, $o'$ (Figs. 12-13) are simultaneously visible in said eye piece in juxtaposition to each other: As seen in Fig. 14 each image O, O' occupies within the field of vision of the eye piece $i$ a semicircular area.

Supposing the surface of plate $o$ has been ground—following roughing on a planing machine—by a grinding wheel of fine grain, while plate $o'$ has been ground by a grinding wheel of coarser grain: On inspection under the comparison microscope (Fig. 11) plate $o$ will present a magnified image O showing thin shadow lines, closely assembled and indicating, that the inspected surface is in rather smooth—finished—condition, while image O' being a magnification of plate $o'$ and showing broader shadow lines, wider apart from each other, indicates, that the plate $o$ is still in unfinished condition.

As a matter of fact twin microscopes of the design described with reference to Fig. 11 can be used for testing only relatively small objects, commensurate to the size of the stages $d$, $d'$ and fitting into the space between stage and objective.

Moreover because of their specific design, heavy weight and bulkiness the microscopes concerned are unfit for instance for examining large plates, more especially the inner sections thereof, or for inspecting surfaces generally difficult of access, which are located for instance close to recesses, undercut portions, or in narrow passages, receding corners etc. as will be elucidated in detail hereinafter with reference to Figs. 4 and 5.

The exposed and unprotected position of their objectives, stages, lighting devices etc. calls for rather cautious treatment of such microscopes. They are altogether subject to be damaged if roughly handled. No wonder, that they are to be seen only in research laboratories and the like and have not found their way into work shops.

The primary object of this invention is to overcome the aforesaid drawbacks, inherent to twin microscopes of known design, by so re-designing the latter, that they can be used to advantage in a great variety of fields, including work shops, and for carrying out testing operations under a great many different conditions as regards shape, size, position and accessibility of the surfaces to be tested: For instance in the grinding shops of motor manufacturing plants, where various close fitting parts, such as the bearings and crank pins of multiple throw crank shafts, while chucked on grinding machines must be inspected, or where the working faces of pistons, valves, cams, gear wheels etc., made in large quantities and having received their finishing treatment, must be examined as to their perfection in speedy succession.

In connection therewith the invention aims at providing a multi-purpose twin-microscope, which is of so light weight and takes so little space, that it can be comfortably handled by the operator and introduced into narrow corners and obstructed passages, for instance into motor cylinders, or amidst the crank arms of crank shafts.

Other objects of the invention will become incidentally apparent hereinafter to practitioners in this field.

The nature and scope of this invention are briefly outlined in the appended claims and will be more fully understood from the following specification taken together with the accompanying drawings, in which Fig. 1 is a section vertically taken on line I—I of Fig. 3 through a twin-microscope designed according to this invention, Fig. 2 is a vertical section taken on line II—II in Fig. 1, Fig. 3 is a plan partly in section on line III—III in Fig. 1, Fig. 4 is a side elevation drawn in a smaller scale of the improved twin-microscope, of which the stand is removed, and which is shown in its application for testing various sections of large surfaces, Fig. 5 is a front elevation showing the microscope in its application for inspecting the circumferential faces of a crank pin of a crank shaft, Fig. 6 is a section taken vertically on line VI—VI of Fig. 8, through a structurally modified microscope designed according to this invention, Fig. 7 is another vertical section taken on line VII—VII in Fig. 8,

Fig. 8 is a plan,

Fig. 9 is a fragmentary section horizontally taken on line IX in Fig. 6 through the lower portion of the microscope.

Fig. 10 is a fragmentary section taken vertically through a microscope of the general type shown in Figs. 6-9 but of modified design as far as the primary objective and accessorial parts are concerned;

Figs. 11–14 relating to the prior art have been referred to in detail hereinbefore; (as to the inclusion of the prior art in U. S. patent specifications for elucidating an invention see U. S. Patent 20,314 to Adams of May 25, 1858 and U. S. Patent 1,970,236 to Kluge et al. (August 14, 1934) Sheet 1 of the drawings, and pages 1-3 of the specification).

Whereas with known microscopes of the type shown in Fig. 11, the objectives b, b' are both in staggered but strictly symmetrical disposition relatively to the eye piece i and to the stand T, the eye piece and objectives of the twin-microscopes re-designed according to this invention are differently arranged:

As seen in Figs. 1, 4 and 10 one of the objectives, hereinafter called the "primary" one, which is to produce an enlarged image of the illuminated surface of the object to be tested, is arranged directly underneath the eye piece, so that the optical axis of the latter is in line with or coaxial to the bundle of light rays upwardly proceeding from said primary objectives—while the other objectives—hereinafter called the "secondary" ones—which are associated with the standard object, are arranged in staggered position with respect to the said eye piece.

Referring now more in detail to the microscope shown by way of an example in Figs. 1-5, the latter comprises: A support 10, formed with a handle 11 and a casing 12; an eye piece 20, mounted on said casing; two objectives, enclosed in said casing, the primary one 14 is arranged directly underneath the eye piece 20 and is to be associated with the objects 2 (Fig. 2), 4 (Fig. 4), 5 (Fig. 5) to be tested, whereas the secondary objective 16 is directed against the standard object 1 (Fig. 1), 3 (Fig. 4) and is arranged in staggered position to the eye piece 20; rack and pinion gears 15, 17 are provided within said casing for individually focussing said objectives, and prisms 18, 19 or kindred reflecting means for re-directing the bundle of light rays issuing from the secondary objective 16 into the eye piece 20; electric lamps 27, 28 attached to said casing 12 and enclosed in a protecting cover or hood 29 for illuminating the objects concerned, as indicated by dot and dash lines in Figs. 2, 4 and 5; a stand 21 detachably secured to said support 10 by means of a stay-bolt 22, tightly fitting into a corresponding hole of the support, and a clamping screw 23; a stage 24, adjustably fixed by means of a rack and pinion gear to said stand, for holding the object to be tested; and another stage 26, adjustably fixed by means of a rack and pinion gear to the support 10, for accommodating the standard object. An accessorial structural feature of importance of the support 10 and its casing 12 consists therein, that they are step-shaped at their base so as to present broken faces—best seen in Fig. 4—thus being adapted to be placed directly upon any section of a flat object to be tested; and that apertures a, a' are provided for admitting light illuminating the objects under examination, and light reflected therefrom into the objectives 14, 16; it should be further noted, that the casing 12—being broader than the diameter of the objectives and laterally offsetting from the latter at the apertures a, a'—presents shelters, within which the objectives 14, 16 are safely enclosed and well protected against damages.

In order to facilitate the handling of the microscope on being placed upon rounded objects, such as crank pins of a crank shaft (Fig. 5), rollers 32, 34 or the like may be conveniently provided at the support 10, journalled within arms, which are pivotally fixed at 33, 35 within recesses provided at the base of casing 12, so as to be capable of being swung around their pivots into an outward operative position (Fig. 5) and of being returned into their idle position shown in Figs. 1 and 2.

A structurally modified type of twin-microscopes, designed according to this invention and being shown in Figs. 6-9, is adapted for inspecting the concave inner working faces of hollow or cup shaped pieces of work such as motor cylinders, bearings, ball races etc.

The support of the microscope consists of a tubular shell 40 of preferably cylindrical shape, being closed at the top by a lid 41, which carries eye piece 50 and being provided at its lower end with an aperture 42 and a frame 43; within the latter the objectives are adjustably mounted; the primary objective 44, facing said aperture 42 is arranged at right angles to the optical axis of the eyepiece 50 and is cooperatively associated with a primary reflector 48 arranged truly underneath the eye-piece for re-directing thereinto the image of the object C' to be tested—for instance the ground inner walls of a motor cylinder—while the image of the standard object C, refracted by the secondary objective 46 is reflected twice by a secondary reflector 49 having two reflecting faces, which is arranged closely underneath the eyepiece 50 in staggered position thereto.

A stage 54 for accommodating the standard object C is adjustably connected to the frame 43 by means of a clamping screw having a knurled head and extending through a slot of stage 54 indicated by dash lines. Screw 53 is accessible through an aperture provided in the lower end of shell 40.

Means are provided for individually focussing the said objectives, which comprise a rack and pinion gear 45 (Fig. 9) attached to the primary objective 44 and a screw and nut gear 47, attached to the secondary objective 46; both gears 45, 47 are operable above the microscope being fitted with rotary connecting rods 55, 57, journalled in lid 41 and having knurled heads.

Lighting devices—preferably electric lamps 67, 68—are arranged within the shell 40 at a suitable distance above the said aperture 42 and stage 54 respectively for illuminating the surfaces of the objects C, C' to be examined and compared with each other.

Handling, supporting and guiding means are provided at the shell 40 of the microscope for facilitating the manipulation of the latter on being inserted into the object to be tested.

In the embodiment of the invention shown in Figs. 6–8 by way of an example said supporting and handling means comprise a split flange 70 studded with handles 71, 72, which frictionally engages the shell 40 and is adjustably fixed thereon by means of a clamping screw 73 and a key 74 projecting from the shell 40; the said guiding means comprise a pair of distance rings 80, 81, which frictionally engage the shell 40 in excentric position thereto and are adjustably fitted thereon by suitable clamping means (not shown).

It will be noted, that the modified arrangement, namely indirect cooperation of the primary objective 44 with the eyepiece 50 through a reflector 48, shown and described with reference to Figs. 6–9, is due to the excentric displacement of the surface C' to be inspected relatively to the axis of the eyepiece.

It will also be understood, that various other changes and modifications as regards the structural details of comparison microscopes of the improved design described above may be conveniently made, without departing from the salient ideas of this invention, and without sacrificing advantages attained thereby:

For instance the primary objective 44 and its reflector 48 (Fig. 6), provided for re-directing the image of the object C' to be tested into the eyepiece 40, may be differently arranged.

As shown in Fig. 10 the primary objective 84 may be placed with its optical axis in line with that of the eyepiece 90, truly underneath the latter, while the reflector 88 is arranged below said objective for cooperation therewith in the manner indicated by dot and dash lines in Fig. 10.

What I claim is:—

1. In a comparison microscope the combination with a support having a step shaped base, of two objectives spaced from each other, a primary and a secondary one, which are adjustably mounted in said support with their central axes being parallel to each other, an eye piece mounted on said support coaxially to the bundle of light rays issuing from said primary objective, reflecting elements arranged underneath said eyepiece in staggered position thereto, so as to re-direct into said eye piece the bundle of light rays issuing from said secondary objective, and a stage adjustably attached to said support for cooperation with the secondary objective, the latter being arranged at a higher level than the primary one.

2. In a comparison microscope the combination with a support having a step shaped base, of two objectives spaced from each other, a primary and a secondary one, which are adjustably mounted in said support with their central axes being parallel to each other, an eye piece mounted on said support coaxially to the bundle of light rays issuing from said primary objective, reflecting elements arranged underneath said eye piece in staggered position thereto, so as to re-direct into said eye piece the bundle of light rays issuing from said secondary objective, and a stage adjustably attached to said support for cooperation with the secondary objective, the latter being arranged at a higher level than the primary one, said support being formed with a handle integral therewith, relatively to which the said objectives are arranged in series.

3. In a comparison microscope the combination with a support having a step shaped base, of two objectives spaced from each other, a primary and a secondary one, which are adjustably mounted in said support with their central axes being parallel to each other, an eye piece mounted on said support coaxially to the bundle of light rays issuing from said primary objective, reflecting elements arranged underneath said eye piece in staggered position thereto, so as to re-direct into said eye piece the bundle of light rays issuing from said secondary objective, and a stage adjustably attached to said support for cooperation with the secondary objective, the latter being arranged at a higher level than the primary one, recesses being formed at the bottom of said step shaped base and rollers being pivotally fixed therein for supporting the microscope.

4. In a comparison microscope the combination with a support having a step shaped base, of two objectives spaced from each other, a primary and a secondary one, which are adjustably mounted in said support with their central axes being parallel to each other, an eye piece mounted on said support coaxially to the bundle of light rays issuing from said primary objective, reflecting elements arranged underneath said eye piece in staggered position thereto, so as to re-direct into said eye piece the bundle of light rays issuing from said secondary objective, and a stage adjustably attached to said support for cooperation with the secondary objective, the latter being arranged at a higher level than the primary one, the support being detachably fixed on a stand, the latter having a stage adjustably attached for cooperation with the primary objective.

5. In a comparison microscope the combination with a support having a step shaped base, of two objectives spaced from each other, a primary and a secondary one, which are adjustably mounted in said support with their central axes being parallel to each other, an eye piece mounted on said support coaxially to the bundle of light rays issuing from said primary objective, reflecting elements arranged underneath said eye piece in staggered position thereto, so as to re-direct into said eye piece the bundle of light rays issuing from secondary objective, and a stage adjustably attached to said support for cooperation with the secondary objective, the latter being arranged at a higher level than the primary one, the support being formed with a casing enclosing said objectives, and apertures being provided at the base of said casing for the admission of light to the objects under examination and to said objectives.

6. In a comparison microscope the combination with a support having a step shaped base, of two objectives spaced from each other, a primary and a secondary one, which are adjustably mounted in said support with their central axes being parallel to each other, an eye piece mounted on said support coaxially to the bundle of light rays issuing from said primary objective, reflecting elements arranged underneath said eye piece in staggered position thereto, so as to re-direct into said eye piece the bundle of light rays issuing from said secondary objective, and a stage adjustably attached to said support for cooperation with the secondary objective, the latter being arranged at a higher level than the primary one, the support being formed with a casing enclosing said objectives, apertures being provided at the base of said casing for the admission of light to the objects under examination and to said objectives, and sources of light being fitted to said casing.

7. In a comparison microscope the combination with a support having a step shaped base, of two objectives spaced from each other, a primary and a secondary one, which are adjustably mounted in said support with their central axes being parallel to each other, an eye piece mounted on said support coaxially to the bundle of light rays issuing from said primary objective, reflecting elements arranged underneath said eye piece in staggered position thereto, so as to re-direct into said eye piece the bundle of light rays issuing from said secondary objective, and a stage adjustably attached to said support for cooperation with the secondary objective, the latter being arranged at a higher level than the primary one, the support being formed with a casing enclosing said objectives, apertures being provided at the base of said casing for the admission of light to the objects under examination and to said objectives, sources of light being fitted to said casing, and means provided for protecting the said sources of light.

OTTO URSINUS.